(No Model.)
C. A. DEARBORN.
BOBBIN WINDER FOR SEWING MACHINES.
No. 274,088. Patented Mar. 13, 1883.
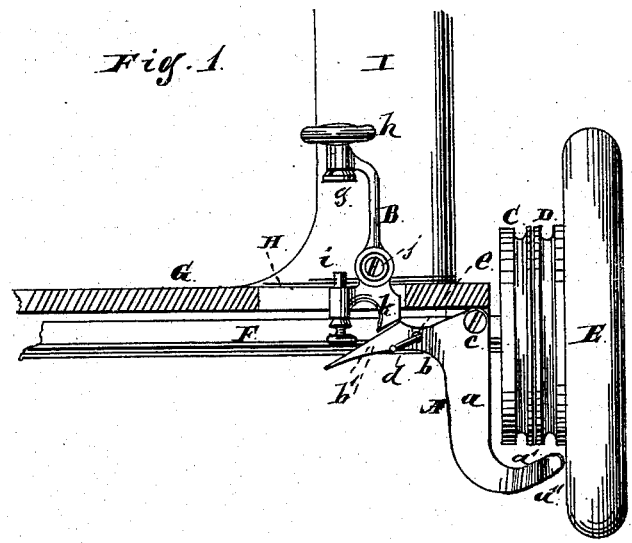
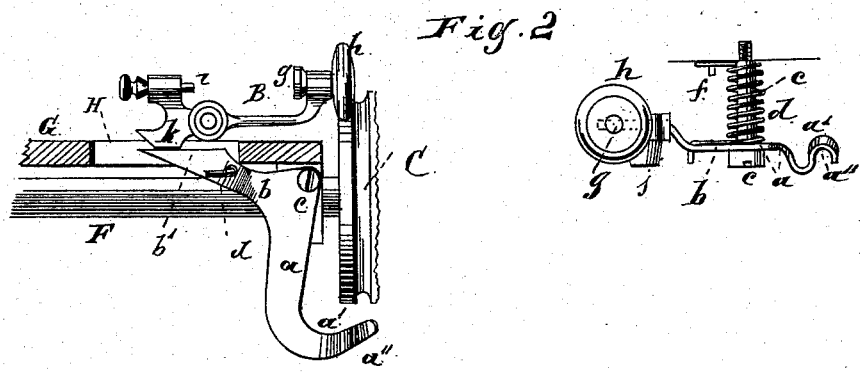
Witnesses:
H. F. Bruns.
Albert H. Adams.
Inventor:
Charles A. Dearborn

UNITED STATES PATENT OFFICE.

CHARLES A. DEARBORN, OF CHICAGO, ILLINOIS, ASSIGNOR TO THE EMPRESS SEWING MACHINE COMPANY, OF SAME PLACE.

BOBBIN-WINDER FOR SEWING-MACHINES.

SPECIFICATION forming part of Letters Patent No. 274,088, dated March 13, 1883.

Application filed July 31, 1882. (No model.)

*To all whom it may concern:*

Be it known that I, CHARLES A. DEARBORN, residing at Chicago, in the county of Cook and State of Illinois, and a citizen of the United States, have invented new and useful Improvements in Bobbin-Winders for Sewing-Machines, of which the following is a full description, reference being had to the accompanying drawings, in which—

Figure 1 is a side elevation showing the parts in the position they occupy when the bobbin-winder is not in use; Fig. 2, a top or plan view of the bobbin-winder and the shifting arm or lever in the position shown in Fig. 1; Fig. 3, a side elevation showing the bobbin-winder and the shifting arm or lever in the position they occupy when the bobbin-winder is in use.

The object of this invention is to automatically shift the belt from the fast to the loose pulley, and vice versa, as the bobbin-winder is brought into position for use or thrown in position to be out of use, and is intended to be used in connection with a bobbin-winder which is driven by having its periphery engaged with the driving-belt of the sewing-machine or with a loose pulley located on the main driving-shaft of the machine, or in any other suitable manner in connection with a loose pulley on which the belt is to be shifted to have the machine stop when the bobbin-winder is to be used, and from which loose pulley the belt is changed to the fast pulley for operating the machine when the bobbin is filled and the bobbin-winder is out of use; and its nature consists in providing a shifting arm or lever arranged to engage the driving-belt and be engaged by and operated from the movements of the bobbin-winder in being thrown into or out of use to automatically shift the belt, and in providing a spring or other controlling means for the shifting arm or lever for retaining it in place and holding it against vibrations and the movements of the belt.

In the drawings, A represents the shifting arm or lever, formed of any suitable material, by cutting or otherwise, so as to have a main or body portion, $a$, with an end extension, $a'$, which is bent or curved to have at its extreme end a groove or opening, $a''$, to receive the driving-belt, and allow such belt to pass freely, without slipping readily out of the groove or opening $a''$. This arm or lever has a side extension, $b$, the extreme end, $b'$, of which has a beveled edge or face. This arm A is pivotally attached to the bed-plate or other part of the machine by a suitable pin or pivot, $c$, so as to have the end, $a'$, swing in the arc of a circle below the fast and loose pulleys at the proper point for the groove or opening $a''$ to engage the driving-belt and shift it from one pulley to the other, accordingly as the arm or lever A is swung or turned on the pivot $c$. Around the pin or pivot $c$, in the form of construction shown, is located a coil-spring, $d$, one end of which passes through an opening, $e$, in the side extension, $b$, and the other engages a pin or stud, $f$, located on the bed-plate or other part of the machine. This spring is arranged to act against the arm or extension $b$ and draw the arm or end $a'$ toward the loose pulley, and it also acts to retain the arm or lever A in whatever position it may be swung, and to resist vibrations of the arm or lever from the driving-belt, maintaining the arm or lever in a steady and firm position when in engagement with its actuating devices.

B is the bobbin-winder, carrying a spindle, $g$, operated from a wheel, $h$, and a sliding spindle, $i$, between which spindles the bobbin to be wound is held, as shown. This bobbin-winder is pivoted by a suitable pin or pivot, $j$, to the bed-plate of the machine, or arm or standard of the machine, so that it can be swung or turned to bring the wheel $h$ in contact with the driving-belt or with the periphery of the loose pulley or otherwise, and impart a rotary movement to the wheel and drive the spindle $g$ to revolve the bobbin and wind the thread thereon. The frame of the bobbin-winder may be of the form shown or of other well-known form, and is to be provided with an extension, $k$, having a beveled face in the form of construction and arrangement shown, to engage the beveled face or side $b'$ of the arm or extension $b$, and through such engagement operate the arm or lever A as the bobbin-winder B is swung on its pivot. The turning or swinging of the bobbin-winder into position for use raises the extension or stop $k$, and allows the spring $d$ to act and turn the arm or lever A on its pivot, swinging the end or arm $a'$ over in line, so that the groove $a''$ will come in line with the loose pulley, and as the belt is engaged by the groove it will be carried over, so as to pass from the fast to the loose pulley to drive such pulley. The reverse movement of the bobbin-winder, to throw it out of use by the engagement of the extension or stop $k$ with the arm or extension $b$, turns or swings the arm or lever A on its pivot, carrying the groove $a''$, with the driving-belt, into position for the belt to pass to the fast pulley, as shown in Fig. 1, the position of the parts when the bobbin-winder is in use being shown in Fig. 3. The relation between the extension or stop $k$ and the arm or extension $b$ is one that limits the movement of the arm or lever A in shifting the belt onto the loose pulley, stopping the movement of the arm or lever A at the proper point for this purpose, which point is reached as the wheel $h$ is brought into engagement with its driving device, the spring $d$, in the form of construction shown, controlling the movement in the opposite direction, in connection with the stop or extension $k$.

C is the loose pulley; D, the fast pulley; E, the balance-wheel; F, the main driving-shaft; G, the bed-plate; H, the opening in the bed-plate for allowing the bobbin-winder to be turned or wound on its pivot; I, the arm or standard of the machine. These parts represented by the letters C D E F G H I may be of the form of construction and arrangement shown, or of any other form of construction and arrangement that will bring the fast and loose pulleys in proper relation for the bobbin-winder to be operated from the belt, loose pulley, or otherwise, and for the belt to be shifted automatically from one pulley to the other by the action of the arm or lever A.

The operation is as follows: When the bobbin is to be wound it is placed between the spindles $g$ and $i$, and the bobbin-winder turned to bring the periphery of the wheel $h$ into engagement with the driving-belt or the periphery of the wheel or pulley C, or otherwise, which movement of the bobbin-winder carries the arm or lever A over to shift the belt from the fast pulley onto the loose pulley, in the manner before described, and when the bobbin is filled the bobbin-winder is turned or swung into position to be out of use, which movement carries the arm or lever A over to shift the belt from the loose pulley onto the fast pulley, as before described.

Instead of having the lever and bobbin-winder separated, as shown and described, they could be joined or hinged together to cause the movement of the bobbin-winder to operate the arm or lever and automatically shift the belt, the form or shape of the arm or lever being changed to enable the joining or hinging of the two devices to be made, and a cam-face could be provided on the arm or lever to be engaged by the bobbin-winder, and thereby operate the arm or lever A and automatically shift the belt. This arrangement is very simple, and by its use the trouble and labor attending the shifting of the belt are entirely obviated and the belt is controlled by the position of the bobbin-winder, and must be shifted as required for use with the winder or with the machine. As shown, the shifting arm or lever is used in connection with a main shaft located below the bed-plate, but can be used in connection with driving-shafts otherwise located, the arm or lever being arranged on the machine to engage with the driving-belt and shift the same from the fast to the loose pulley, and its shape can be varied from that shown to adapt it to the location and arrangement of the fast and loose pulleys and the driving-belt and bobbin-winder.

What I claim as new, and desire to secure by Letters Patent, is as follows:

1. An arm or lever formed to engage the driving-belt at one end and arranged to be automatically operated by the movements of the bobbin-winder when attached to the machine, substantially as specified.

2. An arm or lever, A, having an end or extension, $a'$, provided with a groove, $a''$, and an arm or extension, $b$, in combination with a bobbin-winder engaged with or connected to the arm or extension $b$ for operating the arm or lever A with the bobbin-winder to automatically shift the belt, substantially as specified.

3. An arm or lever, A, having an end or extension, $a'$, provided with a groove, $a''$, and an arm or extension, $b$, having the end $b'$ with an inclined face, in combination with a bobbin-winder having an extension or stop, $k$, for moving the arm or lever in one direction from the bobbin-winder, substantially as and for the purposes specified.

4. An arm or lever, A, having an end or extension, $a'$, with a groove, $a''$, and an arm or extension, $b$, having the end $b'$ with an inclined face, in combination with a bobbin-winder having an extension or stop, $k$, and a spring, $d$, for operating the arm or lever from the movements of the bobbin-winder, substantially as and for the purposes specified.

CHARLES A. DEARBORN.

Witnesses:
B. A. PRICE,
ALBERT H. ADAMS.